(12) United States Patent
Cox et al.

(10) Patent No.: US 8,108,345 B2
(45) Date of Patent: Jan. 31, 2012

(54) MANAGING RICH PRESENCE COLLECTIONS IN A SINGLE REQUEST

(75) Inventors: Shaun D. Cox, Redmond, WA (US); Serkan M. Kutan, Seattle, WA (US); Setty Venkateshaiah, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 958 days.

(21) Appl. No.: 11/278,309

(22) Filed: Mar. 31, 2006

(65) Prior Publication Data

US 2007/0266076 A1    Nov. 15, 2007

(51) Int. Cl.
*G06F 17/30* (2006.01)

(52) U.S. Cl. ...................................... 707/626

(58) Field of Classification Search ...... 707/9; 709/202, 709/224
See application file for complete search history.

(56) References Cited

U.S. PATENT DOCUMENTS

| | | |
|---|---|---|
| 4,953,159 A | 8/1990 | Hayden et al. |
| 5,195,086 A | 3/1993 | Baumgartner et al. |
| 5,437,009 A | 7/1995 | Lane |
| 5,793,365 A | 8/1998 | Tang et al. |
| 5,857,189 A | 1/1999 | Riddle |
| 5,995,492 A | 11/1999 | Klein et al. |
| 5,999,208 A | 12/1999 | McNerney et al. |
| 6,237,025 B1 | 5/2001 | Ludwig et al. |
| 6,356,921 B1 | 3/2002 | Kumar et al. |
| 6,419,848 B1 | 7/2002 | Qiu et al. |
| 6,559,863 B1 | 5/2003 | Megiddo |
| 6,671,732 B1 | 12/2003 | Weiner et al. |
| 6,757,722 B2 | 6/2004 | Lonnfors et al. |
| 6,985,934 B1 | 1/2006 | Armstrong et al. |
| 6,991,855 B2 | 1/2006 | Weihs et al. |
| 7,240,093 B1 | 7/2007 | Danieli et al. |
| 7,302,270 B1 | 11/2007 | Day |
| 7,469,384 B2 | 12/2008 | Thompson et al. |
| 2002/0035605 A1 | 3/2002 | McDowell et al. |
| 2002/0055967 A1 | 5/2002 | Coussement |
| 2002/0075303 A1 | 6/2002 | Thompson et al. |
| 2002/0075304 A1 | 6/2002 | Thompson et al. |

(Continued)

FOREIGN PATENT DOCUMENTS

EP        1143363        10/2001

(Continued)

OTHER PUBLICATIONS

Rosenberg, J., "A Presence Event Package for the Session Inflation Protocol (SIP)," Aug. 2004, Network Working Group, RFC 3856, ©The Internet Society 2004.

(Continued)

*Primary Examiner* — Sheree Brown
(74) *Attorney, Agent, or Firm* — Merchant & Gould PC

(57) ABSTRACT

A method and system for increasing the computational and network efficiency of presence servers having collections of publications is provided. The presence system uses several techniques that enable a presence server to provide rich presence information without requiring expensive processing. First, the presence system accepts batches of publication updates in a single presence update request. Similarly, the presence system accepts batches of subscription requests. Next, the presence system supports new expiration types for publication update requests that eliminate the need for a publishing user to continually refresh presence information that has not changed. Finally, the presence system accepts access lists that contain membership groups rather than an individual list of users that are to have access to a particular presence collection.

14 Claims, 8 Drawing Sheets

U.S. PATENT DOCUMENTS

| | | | |
|---|---|---|---|
| 2002/0075305 | A1 | 6/2002 | Beaton et al. |
| 2002/0075306 | A1 | 6/2002 | Thompson et al. |
| 2002/0076025 | A1 | 6/2002 | Liversidge et al. |
| 2002/0078150 | A1 | 6/2002 | Thompson et al. |
| 2002/0106998 | A1 | 8/2002 | Presley et al. |
| 2002/0141479 | A1 | 10/2002 | Garcia-Luna-Aceves et al. |
| 2003/0131073 | A1 | 7/2003 | Lucovsky et al. |
| 2003/0158902 | A1 | 8/2003 | Volach |
| 2003/0217142 | A1 | 11/2003 | Bobde et al. |
| 2003/0236086 | A1 | 12/2003 | Litwin |
| 2004/0137921 | A1 | 7/2004 | Valloppillil et al. |
| 2005/0034079 | A1 | 2/2005 | Gunasekar et al. |
| 2005/0046011 | A1 | 3/2005 | Chen et al. |
| 2005/0068167 | A1 | 3/2005 | Boyer et al. |
| 2005/0142495 | A1 | 6/2005 | Van Heerden et al. |
| 2005/0198321 | A1 | 9/2005 | Blohm |
| 2005/0210104 | A1 | 9/2005 | Torvinen |
| 2005/0216848 | A1 | 9/2005 | Thompson et al. |
| 2005/0246544 | A1 | 11/2005 | Moore et al. |
| 2005/0270157 | A1 | 12/2005 | Mohammed et al. |
| 2006/0004921 | A1 | 1/2006 | Suess et al. |
| 2006/0021734 | A1 | 2/2006 | Chang et al. |
| 2006/0026141 | A1 | 2/2006 | Brubacher et al. |
| 2006/0030264 | A1 | 2/2006 | Morris |
| 2006/0190600 | A1* | 8/2006 | Blohm et al. ............. 709/225 |
| 2006/0224688 | A1 | 10/2006 | Morris |
| 2006/0280166 | A1 | 12/2006 | Morris |
| 2006/0282856 | A1 | 12/2006 | Errico et al. |
| 2007/0078965 | A1 | 4/2007 | Shimamura et al. |
| 2007/0100831 | A1 | 5/2007 | Cox |
| 2007/0198725 | A1 | 8/2007 | Morris |
| 2007/0239866 | A1 | 10/2007 | Cox et al. |
| 2007/0266076 | A1 | 11/2007 | Cox et al. |
| 2008/0134259 | A1 | 6/2008 | He |
| 2009/0161293 | A1 | 6/2009 | Takeuchi et al. |
| 2009/0163019 | A1 | 6/2009 | Srivastava et al. |

FOREIGN PATENT DOCUMENTS

| | | |
|---|---|---|
| KR | 20010086883 | 9/2001 |
| KR | 20020044734 | 6/2002 |
| KR | 2002 0074304 | 9/2002 |
| KR | 200200074303 | 9/2002 |
| KR | 20040026389 | 3/2004 |
| KR | 20040091181 | 10/2004 |
| KR | 20050076401 | 7/2005 |
| RU | 2005104119 | 10/2005 |
| WO | WO-01/41477 | 6/2001 |
| WO | WO-2004105411 | 12/2004 |
| WO | WO2005/039221 A1 | 4/2005 |
| WO | WO2005/104569 A2 | 11/2005 |

OTHER PUBLICATIONS

Lonnfors, M. et al., "Partial Publication of Presence Information draft-ietf-simple-partial-publish-01," Oct. 24, 2004, Simple WG, Internet Draft, © The Internet Society 2004.

Lonnfors, M. et al., "Presence Information Data format (PIDF) Extension for Partial Presence draft-ietf-simple-partial-pidf-format-02," Oct. 25, 2004, Simple WG, Internet Draft, © The Internet Society 2004.

Khartabil, H. et al., "An Extensible Markup Language (XML) Based Format for Event Notification Filtering draft-ietf-simple-filter-format-03," Oct. 4, 2004, SIMPLE, Internet-Draft, © The Internet Society 2004.

Patent Cooperation Treaty International Search Report, Jun. 5, 2007, International Application No. PCT/US2007/001980, Applicant: Microsoft Corporation, Date mailed: Jun. 5, 2007 (7 pages).

Patent Cooperation Treaty International Search Report, Jun. 15, 2007, International Application No. PCT/US2007/001985, Applicant: Microsoft Corporation, Date Mailed: Jun. 15, 2007 (8 pages).

Patent Cooperation Treaty International Search Report, Jun. 25, 2007, International Application No. PCT/US2007/001007, Applicant: Microsoft Corporation, Date mailed: Jun. 25, 2007 (8 pages).

U.S. Appl. No. 11/190,503, Cox et al.

Jachner, J. et al., "Rich Presence: A New User Communications Experience," Technology White Paper, User-Centric Conferencing and Collaboration, Alcatel Telecommunications Review, 1st Quarter 2005, © 03 2005 Alcatel.

Rajaniemi, Hannu-Pekka and Kliment Yanev, "SIP and Presence," http://www.cs.helsinki.fi/u/yanev/simplep.pdf, [last accessed Jul. 26, 2007].

Rosenberg et al., "SIP: Session Initiation Protocol," Jun. 2002, Network Working Group, RFC 3261, Standards Track, © The Internet Society 2002.

Rosenberg, J., "A Data Model for Presence," Oct. 25, 2004, SIMPLE, Internet Draft, © The Internet Society 2004.

Rosenberg, J., "A Data Model for Presence," Feb. 21, 2005, SIMPLE, Internet Draft, © The Internet Society 2005.

Schulzrinne, Henning, "RPIDS—Rich Presence Information Data Format for Presence Based on the Session Initiation Protocol (SIP)," Feb. 21, 2003, Internet Engineering Task Force, DRAFT, ©The Internet Society (2003).

Sparks, Robert, "Mobility Plus Presence: Standards on the Fast Track," Jan. 6, 2005, Converge! Network Digest, Blueprint: Circuit-to-Packet, Converge! Media Ventures, Inc., http://www.convergedigest.com/bp-c2p/bp1.asp?ID=1858ctgy=.

Rosenberg, J., "A Presence Event Package for the Session Initiation Protocol (SIP)," Aug. 2004, Network Working Group, RFC 3856, 27 pages http://www.ietf.org/rfc/rfc3856.txt.

USPTO Non-Final Office Action, U.S. Appl. No. 11/190,503, dated May 11, 2009, 10 pages.

Amendment and Response to Non-Final Office action dated May 11, 2009, U.S. Appl. No. 11/190,503, filed Sep. 11, 2009, 12 pages.

USPTO Final Office Action, U.S. Appl. No. 11/190,503, dated Dec. 16, 2009, 11 pages.

Amendment and Response to Final Office action dated Dec. 16, 2009, U.S. Appl. No. 11/190,503, filed Mar. 16, 2010, 11 pages.

USPTO Non-Final Office Action, U.S. Appl. No. 11/190,503, dated Mar. 31, 2020, 11 pages.

USPTO Non-Final Office Action, U.S. Appl. No. 11/278,364, dated Feb. 5, 2008, 10 pages.

Amendment and Response to Non-Final Office Action dated Feb. 5, 2008, U.S. Appl. No. 11/278,364, filed Jun. 5, 2008, 11 pages.

USPTO Non-Final Office Action, U.S. Appl. No. 11/278,364, dated Aug. 6, 2008, 10 pages.

USPTO Final Office Action, U.S. Appl. No. 11/278,364, dated Sep. 15, 2008, 9 pages.

Amendment and Response to Non-Final Office Action dated Aug. 6, 2008 and Final Office Action dated Sep. 15, 2008, U.S. Appl. No. 11/278,364, filed Dec. 4, 2008, 13 pages.

USPTO Non-Final Office Action, U.S. Appl. No. 11/278,364, dated Feb. 20, 2009, 16 pages.

Amendment and Response to Non-Final Office Action dated Feb. 20, 2009, U.S. Appl. No. 11/278,364, filed May 20, 2009, 16 pages.

USPTO Notice of Allowance and Fees Due, U.S. Appl. No. 11/278,365, dated Aug. 13, 2009, 7 pages.

USPTO Non-Final Office Action, U.S. Appl. No. 11/278,338, dated Mar. 23, 2009, 9 pages.

Amendment and Response to Non-Final Office Action dated Mar. 23, 2009, U.S. Appl. No. 11/278,338, filed Jul. 8, 2009, 10 pages.

USPTO Final Office Action, U.S. Appl. No. 11/278,338, dated Dec. 31, 2009, 17 pages.

Amendment and Response to Final Office Action dated Dec. 31, 2009, U.S. Appl. No. 11/278,338, filed Mar. 23, 2010, 12 pages.

USPTO Non-Final Office Action, U.S. Appl. No. 11/278,338, dated Jun. 28, 2010, 17 pages.

Communication from Chilean Patent Office for Chilean Application No. 473-2007, First Office Action, dated Feb. 2, 2007 (5 pages).

Communication from Chinese Patent Office for Chinese Application No. 200780012043.X, First Office Action, dated Nov. 20, 2009 (10 pages).

Communication from Chinese Patent Office for Chinese Application No. 200780012043.X, Response to First Office Action, dated Mar. 18, 2010 (17 pages).

Communication from Chinese Patent Office for Chinese Application No. 200780012043.X, Second Office Action, dated Jul. 29, 2010 (10 pages).

Communication from Chinese Patent Office for Chinese Application No. 200780012043.X, Response to Second Office Action, dated Nov. 29, 2010 (17 pages).
Communication from Chinese Patent Office for Chinese Application No. 200780012043.X, Third Office Action, dated Feb. 23, 2011 (10 pages).
Communication from Chinese Patent Office for Chinese Application No. 200780012232.7, First Office Action, dated Dec. 11, 2009 (12 pages).
Communication from Chinese Patent Office for Chinese Application No. 200780012232.7, Response to First Office Action, dated Apr. 22, 2010 (19 pages).
Communication from Chinese Patent Office for Chinese Application No. 200780012232.7, Notice on Grant of Patent Right and Proceeding with the Registration Formalities, dated Jul. 2, 2010 (4 pages).
Communication from Chinese Patent Office for Chinese Application No. 200780012222.3, First Office Action, dated Dec. 31, 2010 (11 pages).
Communication from Russian Patent Office for Russian Application No. 2008138710, First Office Action, dated Dec. 17, 2010 (6 pages).
Communication from Russian Patent Office for Russian Application No. 2008138712, First Office Action, dated Jan. 28, 2011 (6 pages).
Communication from Russian Patent Office for Russian Application No. 2008138711, First Office Action, dated Mar. 1, 2011 (6 pages).
Amendment and Response to Non-Final Office Action dated Mar. 31, 2010, U.S. Appl. No. 11/190,503, filed Aug. 2, 2010 (12 pages).
USPTO Final Office Action, U.S. Appl. No. 11/190,503, dated Nov. 22, 2010 (19 pages).
Amendment and Response to Final Office Action, U.S. Appl. No. 11/190,503, filed Mar. 22, 2011 (15 pages).
Amendment and Response to Non-Final Office Action from United States Patent Trademark Number, U.S. Appl. No. 11/278,338, dated Nov. 29, 2010 (12 pages).
USPTO Final Office Action, U.S. Appl. No. 11/278,338, dated Feb. 17, 2011 (18 pages).
Communication from Russian Federation for Russian Application No. 2008138711, Decision on Grant of a Patent for Invention (translation), dated Apr. 13, 2011 (6 pages).
Schulzrinne et al., "RPID: Rich Presence Extensions to the Presence til.fin-mation Data Format (PIDF) draft-ietf-simple-rpid-09.txt", IETF Standard-Working-Draft, Internet Engineering Task Force, IETF, CH, vol. simple, No. 9. Sep. 24, 2005, 40 pages.
Rosenberg et al., "A Data Model for Presence; draft-ietf-simple-presence-data-model-07.txt", IETF Standard-Working-Draft, Internet Engineering Task Force, IETF, CH, vol. simple, No. 7. Jan. 22, 2006, 36 pages.
Niemi et al., "Session Initiation Protocol (SIP) Extension for Event State Publication; rfc3903.txt", IETF Standard, Internet Engineering Task Force, IEFT, CH, Oct. 1, 2004, 34 pages.
Supplemental European Search Report dated Aug. 19, 2011 in European Application No. 07716619.7, 10 pages.
Decision on Grant of a Patent for Invention for Russian Patent Application No. 2008138710, issued Mar. 29, 2011.
Response and Amendment to Final Rejection mailed Feb. 17, 2011, to U.S. Appl. No. 11/278,338, filed Jul. 18, 2011.
Notice of Allowance mailed Jun. 7, 2011, in U.S. Appl. No. 11/190,503.
Amendment and Response to Final Office Action dated Feb. 17, 2011, in U.S. Appl. No. 11/278,338.
Chinese Decision on Rejection mailed Sep. 26, 2011, in Chinese Patent Application No. 200780012043.X (7 pages).

* cited by examiner

```
210 ⎯⎯ PUBLISH

220 ⎯⎯ Event: presence
       Content-type: application/msrtc-presence-publish
       ...

232 ⎯⎯ <publish xmlns="http://schemas.microsoft.com/2006/09/sip/rich-presence">
         <publications>
235 ⎯⎯     <publication categoryName="status" instance="laptop" container="1"
              version="0" uri="sip:foo@bar.com" expireType="user"/>
240 ⎯⎯     <publication categoryName="status" instance="desktop" container="2"
230          version="0" uri="sip:foo@bar.com" expireType="device"/>
250 ⎯⎯     <publication categoryName="location" instance="laptop" container="2"
              uri="sip:foo@bar.com" expireType="0"/>
         </publications>
       </publish>
```

*FIG. 2*

410 { SUBSCRIBE

420 {
Event: presence
Content-type: application/msrtc-event-category-filter+xml
...

440 {
<batchSub xmlns= "http://schemas.microsoft.com/2006/01/sip/batch-subscribe">
442 { <action name="subscribe">
445 {
<adhocList>
<resource uri="sip:userA@bar.com"/>
<resource uri="sip:userB@bar.com"/>
</adhocList>
450 {
<categoryList>
<category name="location"/>
<category name="status"/>
<category name="enterprise.location"/>
</categoryList>
</action>
</batchSub>

*FIG. 4*

```
<setContainerMembers xmlns="http://schemas.microsoft.com/2006/09/sip/container-management">
    <container id="1" version="0">
        <member type="uri" value="user1@domain.com" action="add"/>
        <member type="sameDomain" action="remove"/>
        <member type="contactList" action="add"/>
    </container>
</setContainerMembers>
```

FIG. 6

MANAGING RICH PRESENCE COLLECTIONS IN A SINGLE REQUEST

BACKGROUND

Presence servers are increasingly being used to provide presence information such as the availability status of users. Presence information of a user identifies the current "presence state" of that user. Users may make their presence information available so that other users can decide how best to communicate with them. For example, the presence information may indicate whether a user is logged on ("online") with an instant messaging server or is logged off ("offline"). Presence information may also provide more detailed information about the availability of the user. For example, even though a user is online, that user may be away from their computer in a meeting. In such a case, the presence state may indicate "online" and "in a meeting."

In an instant messaging context, a publishing user ("publisher") may provide their presence information to a presence service that then provides the presence information to subscribing users ("subscribers"). Thus, a presence service may use a subscriber/publisher model to provide the presence information for the publishing and subscribing users of the presence service. Whenever the presence information of a user changes, the presence service is notified of the change by that user's computer system and in turn notifies the subscribing users of the change. A subscribing user can then decide how best to contact the publishing user based on the presence information of the intended participants. For example, if the presence information indicates that a publishing user is currently in a conference telephone call, then the subscribing user may decide to send an instant message, rather than place a telephone call, to the publishing user. If the subscribing user, however, needs to call and speak with the publishing user, the subscribing user can monitor the presence information of the publishing user to know when the call can be placed. When the subscribing user notices that the publishing user's presence information indicates that the telephone conference has been concluded, the subscribing user can then place the telephone call.

A particular user may also publish presence information from multiple devices. For example, a user may be logged on to a presence service from a laptop computer, a desktop computer, and a cell phone all at the same time. The presence information may indicate the user's status on each device. This is particularly useful if, for example, the user is walking to a meeting with a cell phone and has stepped away from their desktop computer. If a subscribing user wants to contact the publishing user, the presence information may indicate that a call to the cell phone would be a more effective way to reach the user than an instant message received at the user's desktop computer. Each of a user's devices may also subscribe to the presence information of the user's other devices to enable the devices, for example, to determine which device the publishing user is currently most active at.

Because of the increasing popularity of instant messaging systems and other real-time communications systems, presence services need to support an increasing number of users. In addition, these systems need to support increasingly complex definitions of "presence information." For example, presence information may include calendar information that specifies the availability of a publisher during the next several months. As a result, a presence server is typically developed to provide presence services in an efficient way. Unfortunately, typical presence models require intense computation when presence information is updated. Thus, as more publishers and subscribers are added, additional presence servers are needed to perform the necessary computations.

Early presence systems handled the publishing of presence information by placing all of the presence information in a single XML document. As parts of the user's presence information changed, a publisher had to point to a line in the document and replace it with new presence information or point to a node within an XML subtree and replace it with another XML subtree. This kind of update required the presence server to perform computationally expensive XML parsing. As the number of users and presence updates increase, the burden of XML parsing on the presence server could become overwhelming. This model of publishing presence information also does not allow a subscriber to subscribe to only a portion of a presence document. In addition, individual portions of the document are not versioned such that a subscriber or presence server can easily tell which portions of the document have recently changed. This model also does not allow exposing different versions of a presence document to different subscribers or specifying different authorization information for individual portions of the document.

A more efficient presence system that is less computationally expensive is described in a related application, U.S. patent application Ser. No. 11/190,503 entitled "ORGANIZING PRESENCE INFORMATION INTO COLLECTIONS OF PUBLICATIONS," filed on Jul. 26, 2005, which is incorporated herein in its entirety by reference. The related application describes a method and system for managing presence information based on collections of publications. A presence collection system creates collections of publications for a publisher. A publication includes a type and value, and may be accompanied by attributes such as when the publication should expire. For example, a publication with a type "status" and a value "online" may indicate to subscribing users that the publishing user is currently online. A publisher may define one collection of publications that is to be made available to certain subscribers and another collection of publications that is to be made available to other subscribers. For example, one collection may be visible to the public, while another may be visible only to coworkers of the publishing user. Each collection contains a list of the users that are allowed to subscribe to the information within that collection. The presence collection system may allow a publisher to update individual publications within a collection. Upon receiving the update, the presence server can quickly update the presence information without having to rely on computationally expensive parsing of XML documents. Each collection of publications may also contain categories of information. A category is a type of publication that spans multiple collections. For example, a category "status" may have a publication with a value "not available" in a collection that is available to the public, and a publication with a value "in a meeting with John" in a collection available to coworkers. Publications may also specify an instance identifier. An instance identifier differentiates similar information within the same collection. For example, a user may have a publication "status" with an instance of "laptop" that indicates the status of the user at their laptop, and another publication "status" with an instance of "cell phone" that indicates the status of the user at their cell phone.

Although the presence collection system is an improvement over prior techniques, it may place a higher burden on network resources and the presence server. For example, a publishing user who sends separate updates to many publication instances within many collections to a presence server creates a high amount of network traffic to the presence server. Similarly, a subscribing user who receives separate notifications for each publication that is updated creates a high amount of network traffic from the presence server to the subscribing user's logged-on device or devices. Typically, presence publications are set to expire within a fixed amount of time, and must be periodically refreshed by the publishing user in order to keep the publications published. The need to refresh many publications that have not changed creates an unnecessary burden on the server. Finally, the addition of collections having varying degrees of detail available to different subscribing users creates an opportunity to expose presence information to broader groups of subscribers. The list of users with access to a collection can grow quite large and the computational cost of checking which collection a particular subscriber should be subscribed to only increases as the list grows, causing an additional burden to the presence server.

SUMMARY

A method and system for increasing the computational and network efficiency of presence servers having collections of publications is provided. The presence system uses several techniques that enable a presence server to provide rich presence information without requiring expensive processing. First, the presence system accepts batches of publication updates in a single presence update request. Similarly, the presence system accepts batches of subscription requests. Next, the presence system supports new expiration types for publication update requests that eliminate the need for a publishing user to continually refresh presence information that has not changed. Finally, the presence system accepts access lists that contain membership groups rather than an individual list of users that are to have access to a particular presence collection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 is a protocol listing that illustrates the SIP protocol extensions for sending publication updates in one embodiment.

FIG. 4 is a protocol listing that illustrates the SIP protocol extensions for sending subscription requests in one embodiment.

FIG. 6 is a protocol listing that illustrates the SIP protocol extensions for updating collection memberships in one embodiment.

DETAILED DESCRIPTION

Figure 1:
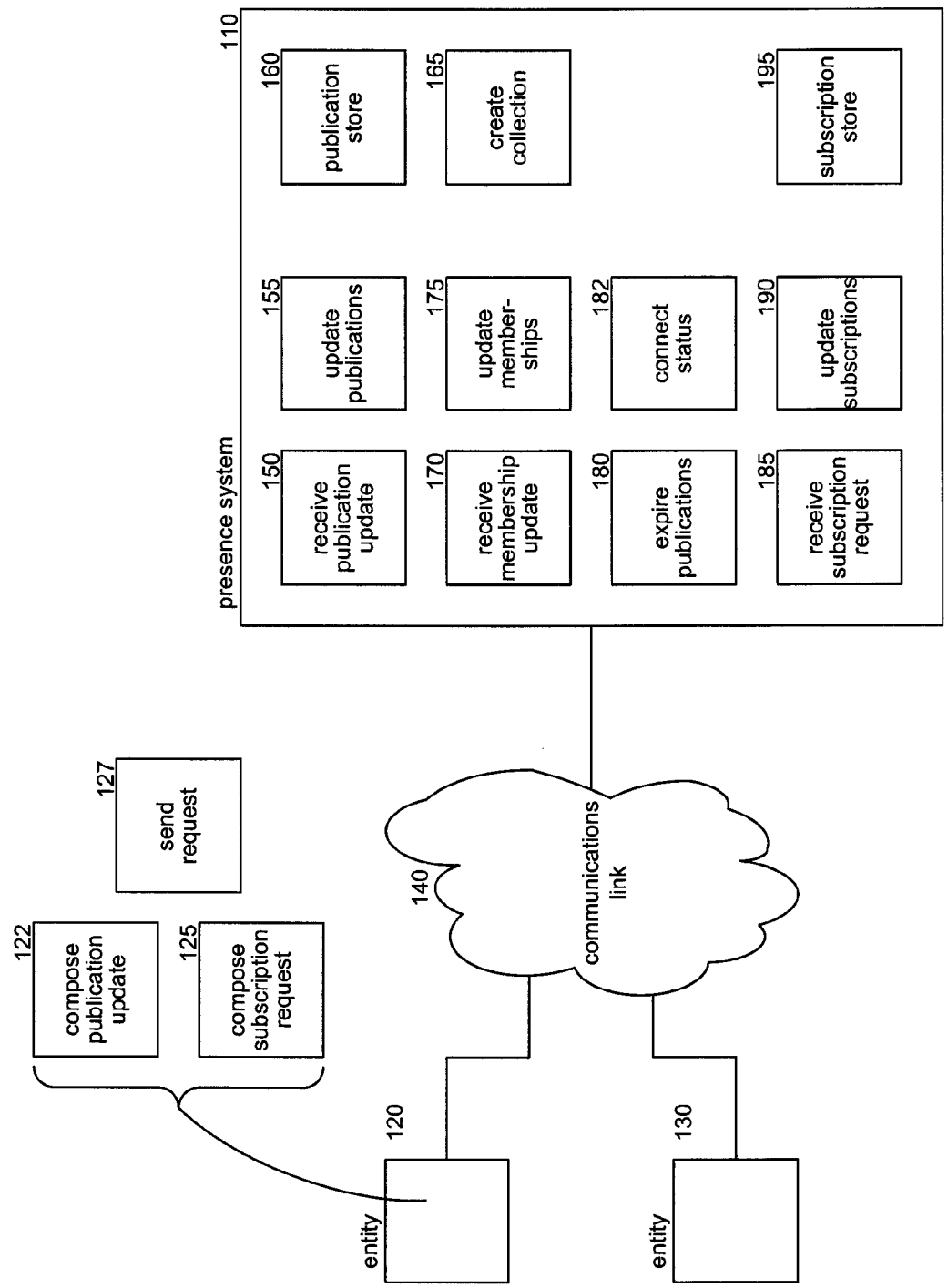
FIG. 1 is a block diagram that illustrates components of the presence system in one embodiment.

A method and system for increasing the computational and network efficiency of presence servers having collections of publications is provided. The presence system uses several techniques that enable a presence server to provide rich presence information without requiring expensive processing. First, the presence system accepts batches of publication updates in a single presence update request. For example, a publishing user can publish multiple categories of information in multiple collections by sending a single update request to the presence server. Similarly, the presence system accepts batches of subscription requests. For example, a subscribing user can request a subscription to multiple categories of information in multiple collections by sending a single subscription request to the presence server. Next, the presence system supports new expiration types for publication update requests that eliminate the need for a publishing user to continually refresh presence information that has not changed. For example, a publishing user's home phone number rarely changes, so the presence system allows the user to publish this information once and not update it unless the information changes, rather than republishing the information once per hour. Finally, the presence system accepts access lists that contain membership groups rather than an individual list of users that are to have access to a particular presence collection. For example, a publishing user can grant access to all of their coworkers by applying a membership group to a collection without listing each coworker individually.

Publication Batching

In one embodiment, the presence system accepts multiple presence publications in a single request. The publications can span multiple categories, instances, and collections. For example, a publishing user having publication categories "status" and "location" can publish a status of "not available" and a location of "Microsoft Headquarters" in a collection accessible to the public and a status of "in a meeting with John" and a location of "Bldg 40/Conference Room 5" in a collection accessible to coworkers. The publishing user can also publish multiple instances of the same information within each collection. For example, a category "phone number" might have instances of "home" for a home number, "work" for a work number, and "mobile" for a cell phone number. The user can publish values for each of these instances in the same publication request.

In one embodiment, the presence system accepts unpublishing and publishing publications in a single request. For example, a publishing user who is going to a meeting may log off of their desktop computer, causing unpublishing of publication instances relating to the desktop, and the user may become active at their cell phone, causing new instances to need to be added for the cell phone. The presence system can accept both the unpublishing of the desktop publications and the publishing of the cell phone publications in a single update request. For example, an enterprise's network presence service may receive the publication updates from both devices and forward the updates to a global presence service in a single request.

In one embodiment, the presence system sends multiple presence updates using extensions to the Session Initiation Protocol (SIP) and SIP for Instant Messaging and Presence Leveraging Extensions (SIMPLE) protocols. SIP is an application-layer control protocol that devices can use to discover one another and to establish, modify, and terminate sessions between devices and is an Internet proposed standard described in "RFC 3261." RFC 3261, which is available on the Internet at www.ietf.org/rfc/rfc3261.txt, is incorporated herein in its entirety by reference. The SIP standard allows implementers to add extensions to define custom behaviors. The presence system adds a tag <publish> that contains a list of <publication> tags specifying presence information to be published, and a similar <unpublish> tag that contains a list of <publication> tags specifying presence information to be unpublished. Each publication identifies the category, instance, and collection to which it applies. In some embodiments, the presence system accepts an expiration value of zero for a publication within a <publish> tag as an indication to unpublish information rather than having a separate <unpublish> tag.

In one embodiment, the presence system accepts updates for multiple publishing users in a single request. For example, when the SIP protocol is used, each publication may contain the URI of the user to which the publication applies. This allows services to publish information on behalf of a large number of users. For example, an Exchange email server can publish calendar information for all of the users that use the server. As another example, a cell phone carrier can publish information on the location of its cell phone customers to a presence server. In both of these examples, information that would previously have generated extensive network traffic can be published for a large number of users in a single request to the presence server.

In one embodiment, the presence system accepts publication requests having different attributes in a single request. A publishing user may specify a different expiration policy for a publication in one collection than a publication in another collection. For example, in a collection having detailed information for a publication "location," the detailed status information (e.g., "in conference room 2") may change frequently and have a shorter expiration than less detailed information in another collection (e.g., "in Seattle"). As another example, a publishing user may specify a different notification policy for one type of publication than for another in the same request. For example, the notification policy may indicate that updates in certain categories should not result in any notification at all.

Subscription Batching

In one embodiment, the presence system accepts subscriptions from a subscribing user for multiple categories in a single request. For example, a subscribing user that is interested in a publishing user's status and location can compose a single subscribe request that contains "status" and "location" in a list of categories.

In one embodiment, the presence system accepts subscriptions from a subscribing user for multiple publishing users in a single request. For example, a subscribing user can subscribe to multiple categories for User A and User B in a single request. When a subscribing user is subscribing to presence information for each of the users on their list of contacts, this can result in substantial resource savings because all of the subscriptions can be made in a single request. Similarly, the presence system may also accept different category lists for different users in a single request. For example, a subscribing user can subscribe to categories 1 and 2 for User A and categories 3 and 4 for User B in a single request.

In one embodiment, the presence system allows a subscribe request to retrieve presence information without creating a subscription. For example, a user may want to request presence information for a publishing user one time without receiving notifications as the information changes. The user can send a subscribe request with an indication that the request is a query for the current value of the presence information in the specified categories and not a request to create a subscription.

In one embodiment, the presence system accepts the removal of existing subscriptions in the same request as the addition of new subscriptions. For example, if a subscribing user is no longer interested in knowing a publishing user's location, and also would like to track the publishing user's current phone number, the subscribing user can compose a single request that contains the category "status" in a list of categories to unsubscribe from, and the category "phone number" in a list of categories to subscribe to.

In one embodiment, the presence system accepts subscription requests on behalf of multiple subscribing users in a single request. For example, an enterprise may have a local presence server that receives individual subscription requests from subscribing users within the enterprise and forwards the requests to a global presence server as a single batched subscription request.

In one embodiment, the presence system sends multiple presence subscriptions using extensions to the SIP and SIMPLE protocols. The presence system adds a tag <batchSub> that contains a <categoryList> tag that specifies the list of categories to be subscribed to. The <batchSub> tag may also specify an <adhocList> tag that specifies a list of multiple users whose categories are being subscribed to. The presence system also adds a tag <batchUnsub> that also contains tags specifying the list of users and their categories that are being unsubscribed from. The system may also allow a subscribe request with an empty body to indicate that all users and categories should be unsubscribed from, rather than requiring the subscribing user to list every category and user that they have subscribed to.

In one embodiment, the presence system filters out unwanted presence information for a subscribing user by requiring an explicit subscription to each category the subscribing user is interested in. For example, a publishing user may publish hundreds of categories of information, but a subscribing user may only want to know the publishing user's current status. The subscribing user can send a subscribe request indicating a subscription to the category "status" and the user will only receive notifications for that category. This prevents the subscribing user from being overwhelmed with notifications that the user is not interested in as the amount of information provided by the presence server grows.

Expiration Models

In one embodiment, the presence system accepts publications that expire when the publishing device logs off from the presence server. In previous systems the publishing user published information for a fixed duration (e.g., one hour), and had to refresh or republish the information when the publication was near expiration to keep the information published. The presence system defines a new type of expiration that keeps presence information published until the device that published the information goes offline. This is used, for example, when a device such as a cell phone has published instances of information that are valid only while the cell phone is online. When the cell phone is turned off or otherwise goes offline, the presence server can detect it and remove the information that was only relevant while the device was online. When the device is online, it is no longer required to continually update presence information that has not changed to keep it from expiring.

In one embodiment, the presence system accepts publications that expire when the publishing user is no longer online. This expiration type is useful for presence information that applies to multiple devices for as long as the user is online, but that is no longer relevant when the user is offline. The presence system may detect that the user is offline when the user is no longer logged on through any device. The presence system may detect that the user is no longer logged on to a device when the device disconnects from the presence server or when the device informs the presence server that the user is no longer using the device. For example, a public Internet kiosk may allow a user to access the Internet by inserting a USB dongle that identifies the user. When the dongle is removed, the Internet kiosk may inform any services that the user was connected to, such as a presence service, that the user is no longer using the device. While the user is online, the information stays published without refresh requests from the user, thereby saving the presence server from processing additional update requests.

In one embodiment, the presence system accepts publications that do not expire. This expiration type, called static, is useful for information that is relevant whether a user is online or not, such as the user's phone number or address. This expiration type can also be used by services that publish information on behalf of a user. For example, an Exchange server that publishes calendar information for multiple users need not know whether the user is online or not before publishing the user's calendar information, and the information should not expire regardless of the user's current logged-on status. Therefore, such services can publish information by specifying a static expiration type for the publication, and the published information will not be unpublished unless the presence server receives an explicit unpublish request.

Membership Groups

In one embodiment, the presence system accepts collection membership lists that contain groups of users. Previously, the users that had access to a particular collection of presence information were listed explicitly, and a default collection contained information that applied to users not on any list. The presence system allows groups of users to be specified, which reduces the computational difficulty of determining whether a user has access to a collection for large groups of users. Collection membership lists can be specified when presence information is published, or can be specified independently in a separate request. One type of membership group, "contact list," specifies that any subscribing user on a publishing user's list of contacts can view information in a collection that the group is assigned to.

In one embodiment, the presence system accepts a membership group containing users within the same enterprise as a publishing user. This membership group allows a single entry in a user's collection membership list to specify that any subscribing user in the same enterprise should have access to a particular collection. For example, for a large corporation like Microsoft, this allows a collection to be created with additional detail for coworkers that contains a single entry in the membership list that specifies the "same enterprise" membership group. The presence server determines whether a particular subscribing user has access to the collection by checking whether the user's enterprise is the same as the publishing user, such as by querying an external domain controller. This prevents the presence server from replicating the same list of users that the external domain controller already contains.

In one embodiment, the presence system accepts a membership group containing users within a public cloud. A public cloud is defined as an externally available list of users provided by a different organization. The public cloud membership group is useful when one operator of a presence server has partnerships with operators of other presence systems. For example, a presence server using Microsoft's instant messaging software could interact with AOL, Yahoo, and other instant message platforms using the public cloud membership groups. By specifying the public cloud membership group in a collection membership list, a publishing user can define the presence publications that members of other presence systems can subscribe to and view without having to list each member explicitly in the collection membership list.

In one embodiment, the presence system accepts a federated membership group. A federated membership group is one in which multiple entities define lists of users that should have similar access to presence information. For example, two corporations such as Microsoft and Intel can make their employee lists available for federated membership groups. A presence server receiving publications with a federated membership group type refers to specified federated membership servers to determine which users are members of the federated group. A publishing user can then specify publications that the federated group can subscribe to.

In one embodiment, the presence system accepts batches of membership list changes in a single request. For example, a publishing user could grant access to subscribing users in the same enterprise membership group to one collection and remove users in the public cloud membership group from the collection in a single request. A publishing user may specify membership lists for multiple collections as well as multiple membership groups and individual users in a membership list for a particular collection in a single request.

By combining the collection model with membership groups, a publishing user can establish a hierarchy of presence information access. For example, a user's calendar information can be made available in detail to coworkers within the same enterprise and be made available as free/busy information (which only indicates the times that a user is free and the times that a user is busy) to the general public. This allows members of the general public to schedule an appointment with the publishing user that does not conflict with the rest of the user's schedule without exposing personal information about what the user is doing. On the other hand, coworkers are provided a more detailed view of what the user is doing so that they can, for example, know that the user will be in a meeting with the coworker later in the day.

FIG. 1 is a block diagram that illustrates components of the presence system in one embodiment. The presence system 110 is connected to entity devices 120 and 130 via a communications link 140, such as the Internet. The entity devices correspond to entities that may be publishers or subscribers. The entity devices include a compose publication update component 122, a compose subscription request component 125, and a send request component 127. The compose publication update component 122 composes update requests to published presence information that may include batches of individual publication updates. The compose subscription request component 125 composes subscription requests that may include batches of subscriptions to multiple categories of presence information for multiple publishing users. The send request component 127 sends publication update requests and subscription requests to the presence system 110.

The presence system includes a receive publication update component 150, an update publications component 155, a receive membership update component 170, an update memberships component 175, an expire publications component 180, a detect connect status component 182, a receive subscription request component 185, an update subscriptions component 190, a create collection component 165, a publication store component 160, and a subscription store component 195. The publication store 160 contains the publications of the publishers. The publications are organized into collections created by the create collection component 165. The receive publication update component 150 is invoked when a request to update one or more publications is received from a publisher. The receive publication update component 150 invokes the update publications component 155 to add, remove, or update publications in the publication store 160 as specified by the request. The receive membership update component 170 is invoked when a request to update the membership list of one or more collections in the publication store 160 is received from a publisher. The request may be received as an independent message or may be part of a publication update request. The receive membership update component 170 invokes the update memberships component 175 to add, remove, and update memberships on collections in the publication store 160. The receive subscription request component 185 is invoked when a request is received from an entity to subscribe to one or more types of publications of a publisher. The receive subscription request component 185 invokes the update subscriptions component 190 to subscribe the entity to the requested types of publications. Subscriptions are stored in a subscription store 195, which may be integrated with the publication store 160. The expire publications component 180 is invoked periodically by the presence system to clean up expired publications in the publication store 160. Although not shown in FIG. 1, the entity devices include components of the presence system to define collections and their memberships, to send publication updates, to send subscription requests, and to receive notifications of updates to publications.

The computing device on which the system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

FIG. 2 is a protocol listing that illustrates the SIP protocol extensions for sending publication updates in one embodiment. The protocol begins with a SIP verb "PUBLISH" 210 that signals a request to publish information. The protocol contains headers 220 that further describe the request, such as its content type. The protocol contains a "<publish>" section 230 that contains a "<publications>" section 232. The "<publications>" section lists publications 235 and 240 to be published and publication 250 to be unpublished. The publication 235 specifies presence information for a category named "status," a specific instance of the category named "laptop," a container (which is a type of collection) identified as "1," a version of "0," a publishing user identified by the SIP address "sip:foo@bar.com," and an expiration type for the publication of "user" which indicates that the publication should be removed when the user goes offline. Although text is shown for some fields for clarity, numbers may also be used. For example, the value of the "instance" field may contain a unique identifier assigned to a device rather than the text "laptop." Another publication 240 specifies the same category "status," but a different instance "desktop" in a different container "2" for the same publishing user. The protocol also contains a publication 250 that is to be removed from the publication store as indicated in this example by an expire type of zero. Although in this example the "expireType" field is overloaded to indicate that a publication is to be unpublished, a separate field or a separate XML section within the protocol could also be used. The publication 250 that is being removed is identified by a category name, an instance identifier, a container identifier, and a publishing user address. Specifying the publishing user's address in a publication allows entities other than the user to publish and unpublish presence information on a user's behalf, such as an Exchange server as described above.

Figure 3:
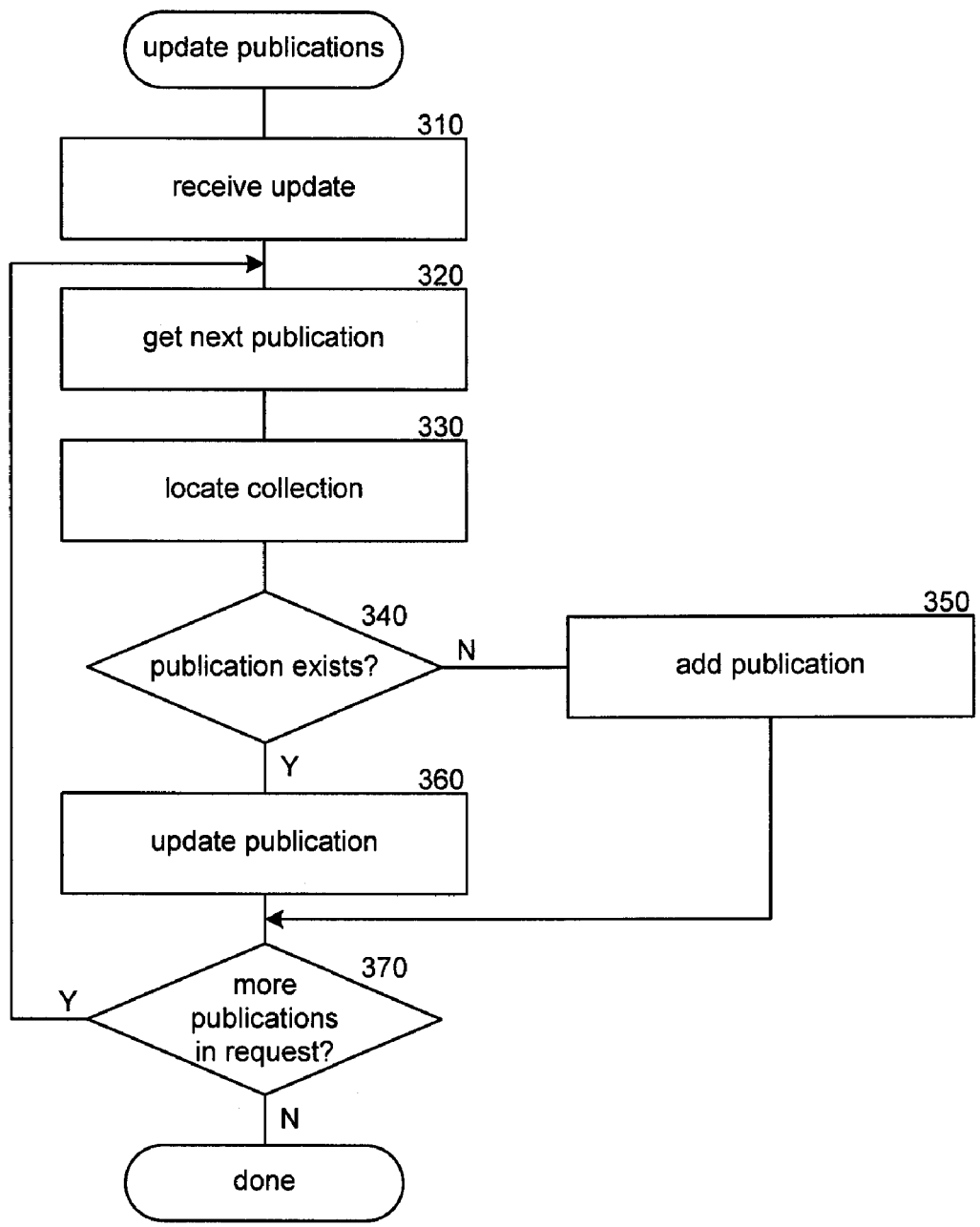
FIG. 3 is a flow diagram that illustrates the processing of the update publications component of the presence system in one embodiment.

FIG. 3 is a flow diagram that illustrates the processing of the update publications component of the presence system in one embodiment. The component is invoked by the receive publication update component when a publish request such as the one in FIG. 2 is received. In block 310, the component receives an update publications request from the receive publication update component. In block 320, the component selects the next publication from the request. In block 330, the component locates the collection for the publishing user identified by the selected publication in the publication store. In decision block 340, if the publication exists, then the component continues at block 360, else the component continues at block 350. In block 350, the publication that did not previously exist is added to the publication store. In block 360, the existing publication in the publication store is updated with the information in the request. In decision block 370, if there are more publications in the request, the component loops to block 320 to select the next publication, else the component completes.

FIG. 4 is a protocol listing that illustrates the SIP protocol extensions for sending subscription requests in one embodiment. The protocol begins with a SIP verb "SUBSCRIBE" 410 that signals a request to subscribe to published information. The protocol contains headers 420 that further describe the request, such as its content type. The protocol also contains a "<batchSub>" section 440 that contains an "<action>" section 442. The action section contains an "<adhocList>" section 445 and a "<categoryList>" section 450. The adhoc list section 445 specifies the identifiers of publishing users whose publications the subscribing user would like to receive notifications for. The category list section 450 specifies the categories to subscribe to for each publishing user. The subscription request will cause the subscribing user to receive notifications for each of the specified categories for each of the specified users. Although not shown in FIG. 4, the request may also contain a list of categories and users to unsubscribe from similar to the subscribe section 440.

Figure 5:
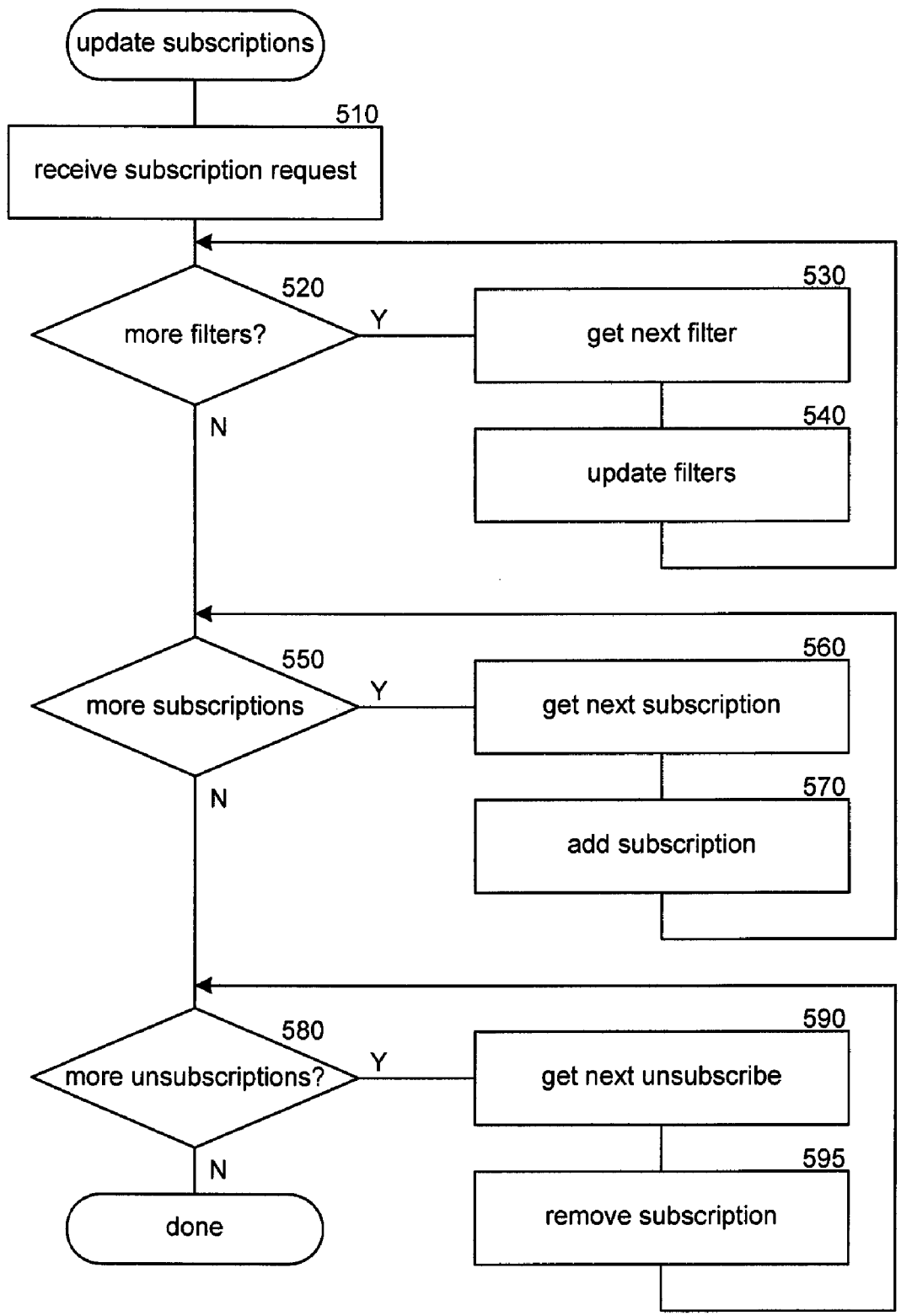
FIG. 5 is a flow diagram that illustrates the processing of the update subscriptions component of the presence system in one embodiment.

FIG. 5 is a flow diagram that illustrates the processing of the update subscriptions component of the presence system in one embodiment. The component is invoked by the receive subscription request component when a subscription request such as the one in FIG. 4 is received. In block 510, the component receives a subscription request from the receive subscription request component. In decision block 520, if there are more category filters contained in the request, then the component continues at block 530, else the component continues at block 550. In block 530, the component selects the next category filter from the request. In block 540, the component updates the category filters in the subscription store. The component then loops to block 520 to determine whether there are any more category filters in the request. In decision block 550, if there are more subscriptions in the request, then the component continues at block 560, else the component continues at block 580. In block 560, the component selects the next subscription from the subscription request. In block 570, the component adds the subscription to the subscription store. The subscription may be in the form of a list of users and a list of categories, such that multiple categories can be subscribed for multiple users in a single subscription section. The component then loops to block 550 to determine whether there are any more subscriptions in the request. In decision block 580, if there are more unsubscriptions in the request, the component continues at block 590, else the component completes. In block 590, the component selects the next unsubscription in the request. In block 595, the component removes the specified subscription from the subscription store. After all of the unsubscriptions are processed, the component completes.

FIG. 6 is a protocol listing that illustrates the SIP protocol extensions for updating collection memberships in one embodiment. The portion of the protocol shown may be included in the body of a SIP publish request as shown in FIG. 2, or it may be part of an independent message type specifically for updating memberships. The protocol begins with a "<setContainerMembers>" section 610 that contains one or more "<container>" sections 615 that identify a collection whose memberships are to be modified. Each container section contains one or more member entries 620, 630, and 640. The first member entry 620 in FIG. 6 specifies a type "uri" that indicates that the value is the SIP URI of a specific user. The action type "add" indicates that the specified user is to be added as a member with access to the specified collection. The second member entry 630 specifies a type "sameDomain" that indicates that the membership of users from the same domain as the publishing user is being modified, and the action type "remove" indicates that access to the collection is being removed. The third member entry 640 specifies a type "contactList" and an action type "add" that indicates that access to the specified collection is to be granted to any member of the publishing user's contact list.

Figure 7:
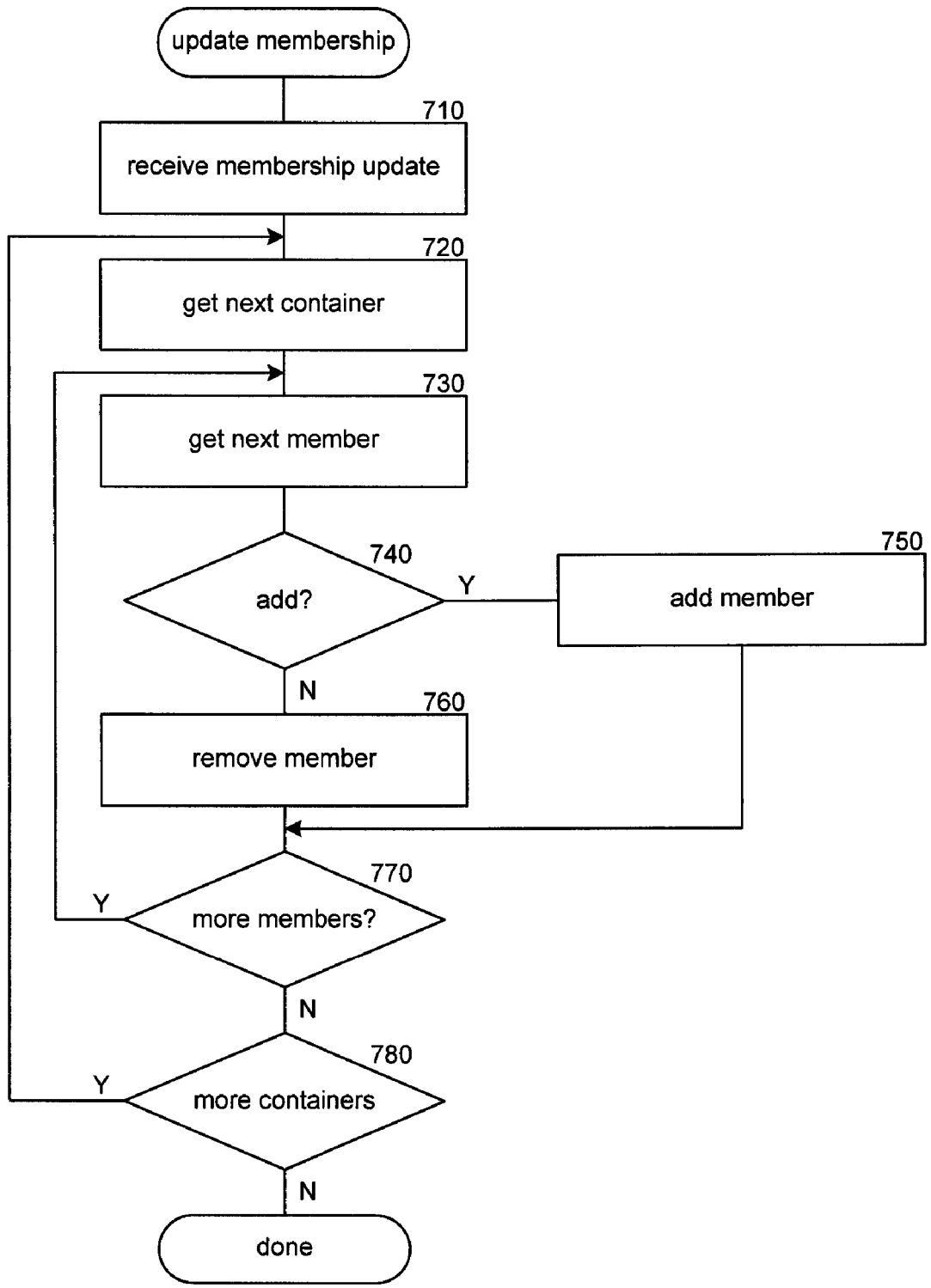
FIG. 7 is a flow diagram that illustrates the processing of the update memberships component of the presence system in one embodiment.

FIG. 7 is a flow diagram that illustrates the processing of the update memberships component of the presence system in one embodiment. The component is invoked by the receive membership update component when a membership update request such as the one in FIG. 6 is received. In block 710, the component receives an update memberships request from the receive membership update component. In block 720, the component selects the next container section from the request. In block 730, the component selects the next member update within the container section. In decision block 740, if the member update contains an action type "add," then the component continues at block 750, else the component continues at block 760. In block 750, the user or group specified in the member update is added to the member list of the selected container in the publication store. In block 760, the user or group specified in the member update is removed from the member list of the selected container in the publication store. In decision block 770, if there are more member updates in the selected container section, then the component loops to block 730 to select the next member update, else the component continues at block 780. In decision block 780, if there are more container sections in the membership update request, then the component loops to block 720 to select the next container section, else the component completes.

Figure 8:
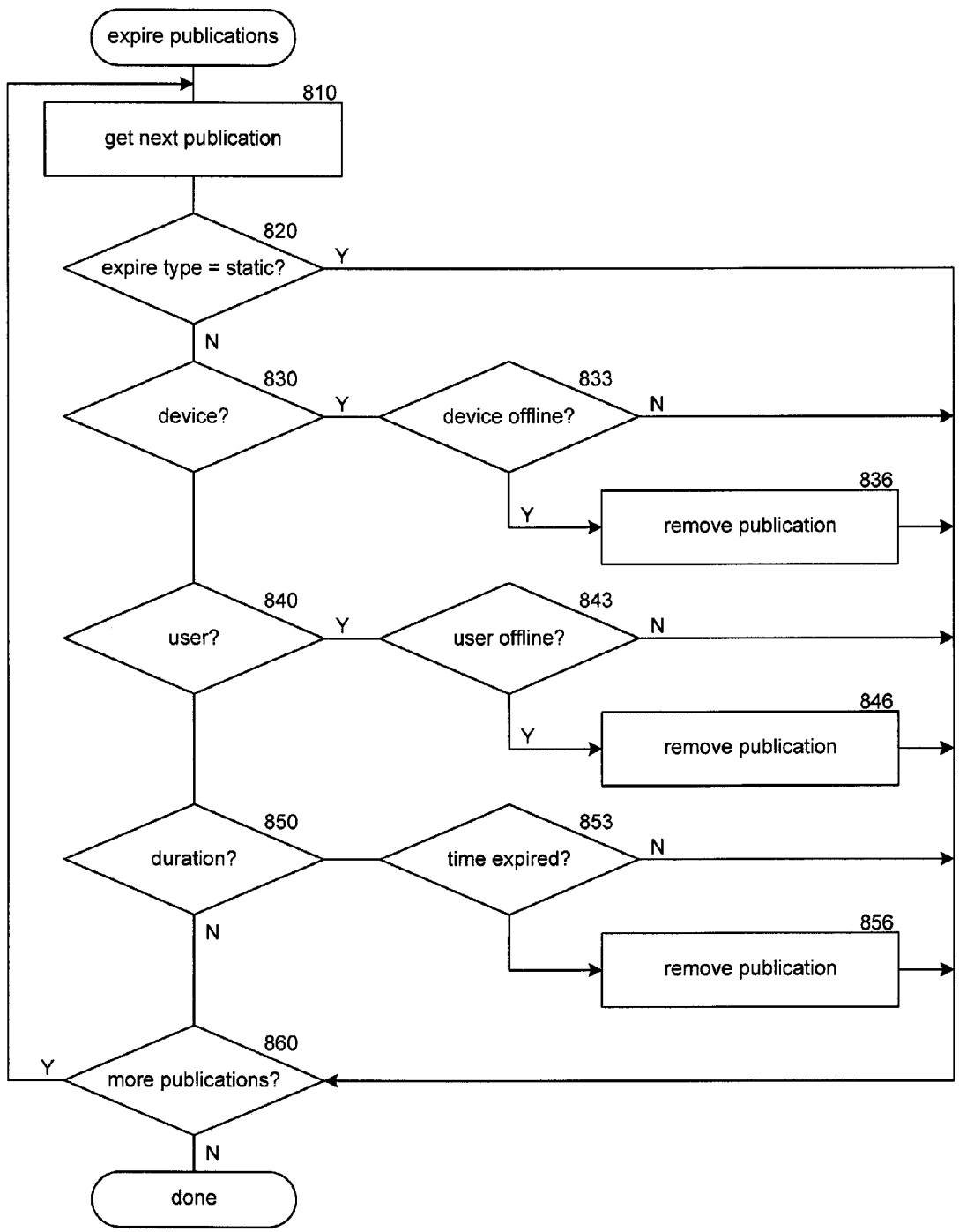
FIG. 8 is a flow diagram that illustrates the processing of the expire publications component of the presence system in one embodiment.

FIG. 8 is a flow diagram that illustrates the processing of the expire publications component of the presence system in one embodiment. The component is invoked periodically by the presence system to remove stale publications from the publication store. In block 810, the component selects the next publication from the publication store. In decision block 820, if the expire type of the selected publication is "static," then the component continues at block 860, else the component continues at block 830. In decision block 830, if the expire type of the selected publication is "device," then the component continues at block 833, else the component continues at block 840. In decision block 833, if the device that published the selected publication is offline, then the component continues at block 836, else the component continues at block 860. In block 836, the component removes the expired publication from the publication store. In decision block 840, if the expire type of the selected publication is "user," then the component continues at block 843, else the component continues at block 850. In decision block 843, if the user that published the selected publication is not logged on through any device, then the component continues at block 846, else the component continues at block 860. In block 846, the component removes the expired publication from the publication store. In decision block 850, if the expire type of the selected publication is "duration," then the component continues at block 853, else the component continues at block 860. In decision block 853, if the amount of time specified for the selected publication has expired, then the component continues at block 856, else the component continues at block 860. In block 856, the component removes the expired publication from the publication store. In decision block 860, if there are more publications in the publication store, then the component loops to block 810 to select the next publication, else the component completes. Although the method depicted shows a polling method of checking for and removing expired publications, it will be understood by those of ordinary skill in the art that other methods could be used such as an event-driven model in which the event of a user or device changing from online to offline status causes the expired publications to be removed directly.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the requests processed by the presence system have been described using the SIP protocol, but other protocols such as a custom protocol on top of the Transmission Control Protocol (TCP) could be used. In some instances steps have been described as being performed by components at the presence server, but they could also be performed by components at the entities that interact with the presence server. The system could also be implemented as a peer-to-peer network in which there is no single, central presence server, but rather presence information could be distributed and stored by the peers. Accordingly, the invention is not limited except as by the appended claims.

We claim:

1. A computer system for updating multiple presence publications using a single update publication batch request, the computer system comprising:
   at least one processor; and
   at least one memory, communicatively coupled to the at least one processor and containing computer-readable instructions that, when executed by the at least one processor, provide:

a publication store component for storing collections, each collection comprising one or more presence publications, wherein each presence publication includes presence information comprising a user identifier identifying a publishing user and a collection identifier identifying a collection to which the presence publication belongs;

an expire publication component for periodically removing expired publications from the publication store;

a receive update publication component for receiving an update publication batch request, the update publication batch request including at least two publication updates wherein a first publication update comprises different presence information than a second publication update in the update publication batch request, the presence information of the first publication update including at least a first user identifier and a first collection identifier;

an update publications component for updating presence information of the at least two presence publications in the update publication batch request, the update publications component configured to:
(a) receive the update publication batch request from the receive update publication component;
(b) select the first publication update in the update publication batch request;
(c) locate a presence publication in the publication store component corresponding to the first publication update, the presence publication located using the first user identifier and the first collection identifier; and
(d) update the presence publication with the presence information in the first publication update.

2. The computer system of claim 1, wherein presence information further comprises an instance identifier that identifies an instance of a publication.

3. The computer system of claim 1 wherein the presence information further comprises a value that specifies a new value for the presence information to be published.

4. The computer system of claim 1 wherein the update publication batch request uses the SIP protocol.

5. The computer system of claim 1 wherein a web service provides modifications to calendar information.

6. The computer system of claim 1 wherein the update publication batch request contains presence publication updates having different attributes.

7. The computer system of claim 6 wherein one attribute is an expiration policy.

8. A computer system for updating multiple presence subscriptions using a single update subscription batch request, the computer system comprising:
at least one processor; and
at least one memory, communicatively coupled to the at least one processor and containing computer-readable instructions that, when executed by the at least one processor, provide:
a subscription store component for storing presence subscriptions, wherein each presence subscription includes presence information comprising a user identifier identifying a subscribing user and a category filter identifying one or more categories of publication to be subscribed to;
a receive update subscription request component for receiving an update subscription batch request, the update subscription batch request including at least two subscription updates wherein a first subscription update comprises different presence information than a second subscription update in the update subscription batch request, the presence information for the first subscription update including at least a first user identifier and a first category filter;

an update subscriptions component for updating presence information of the at least two presence subscriptions in the update subscription batch request, wherein the update subscription component is configured to:
(a) receive the update subscription batch request from the receive update subscription component;
(b) select the first subscription update in the update subscription batch request;
(c) locate a presence subscription in the subscription store component corresponding to the first subscription update, the presence subscription located using the first user identifier and the first category filter; and
(d) update the presence subscription with the presence information in the first subscription update.

9. The computer system of claim 8, wherein the subscription updates comprise more than one type identifier for an identified publishing user, and wherein the subscription updates comprise a request for the more than one type of presence information for a publishing user in the update subscription batch request.

10. The computer system of claim 8 wherein the subscription updates further comprise, for each identified publishing user, an unsubscribe type identifier that identifies a type of presence information for the publishing user to unsubscribe from.

11. The computer system of claim 8 wherein the update subscription batch request contains subscription updates for more than one subscribing user.

12. The computer system of claim 8 wherein the update subscription batch request uses the SIP protocol.

13. The computer system of claim 8 wherein the update subscription batch request further comprises a category filter list that identifies types of presence information for which a subscribing user should be notified.

14. A computer system for updating multiple presence memberships using a single update membership batch request, the computer system comprising:
at least one processor; and
at least one memory, communicatively coupled to the at least one processor and containing computer-readable instructions that, when executed by the at least one processor, provide:
a publication store component for storing presence memberships, wherein each presence membership includes presence information comprising a user identifier identifying a subscribing user and a collection identifier identifying a collection to which the user will be subscribed to;
a receive update membership request component for receiving an update membership batch request, the update membership batch request including at least two membership updates wherein a first membership update comprises different presence information than a second membership update in the update membership batch request, the presence information of the first membership update including at least a first user identifier and a first collection identifier;
an update memberships component for updating presence information of the at least two presence memberships in the update membership batch request, wherein the update membership component is configured to:
(a) receive the update membership batch request from the receive update membership component;
(b) select the first membership update in the update membership batch request;
(c) locate a presence membership in the publication store component corresponding to the first membership update, the presence membership located using the first user identifier and the first collection identifier; and
(d) update the presence membership with the presence information in the first membership update.

* * * * *